INVENTORS.
Walter Rudin
Robert A. Shannon

THEIR ATTORNEYS

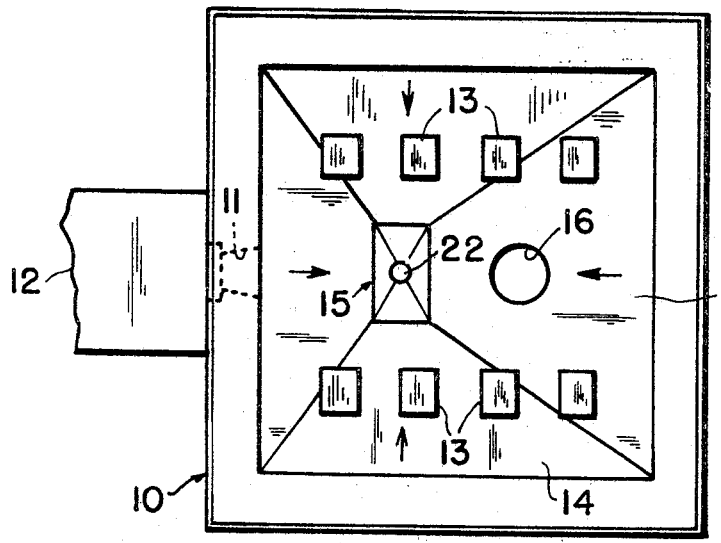
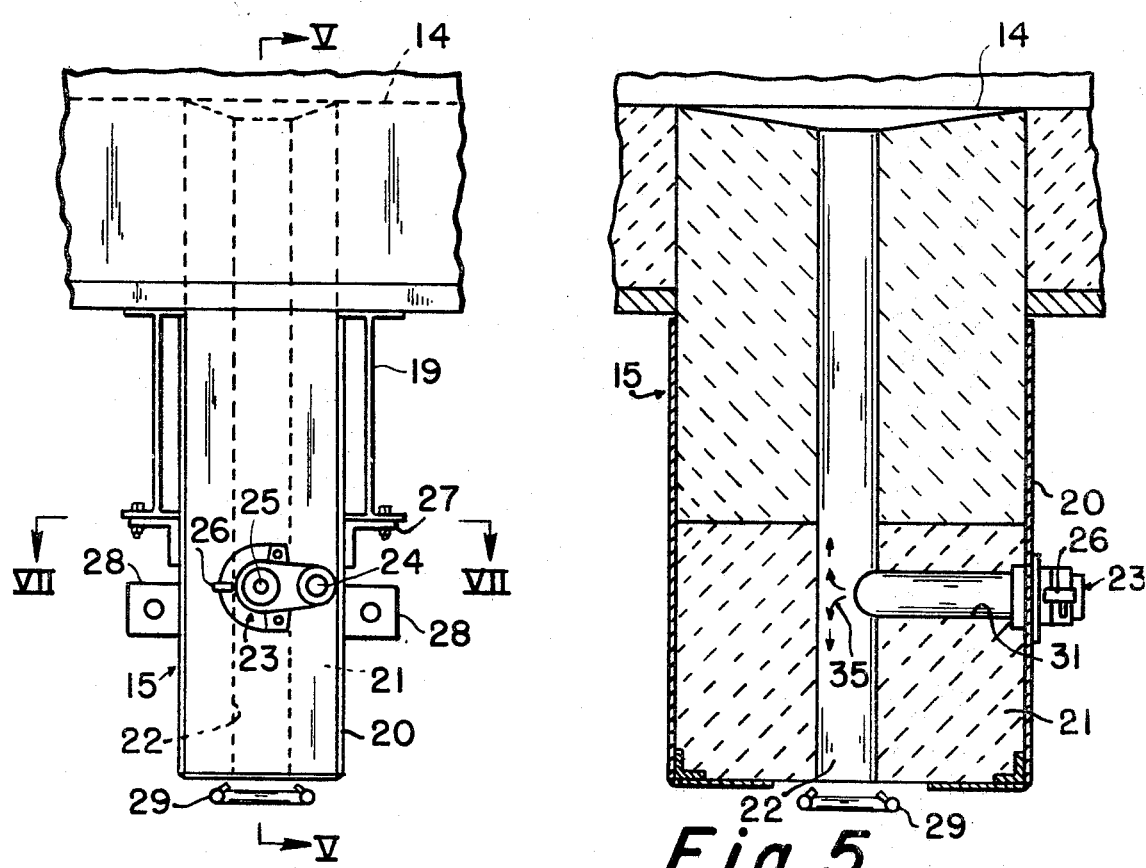

United States Patent Office 3,521,869
Patented July 28, 1970

3,521,869
APPARATUS FOR REMOVING SLAG AND SCALE FROM SOAKING PIT FURNACES
Walter Rudin, Pittsburgh, and Robert A. Shannon, Whitehall, Pa.; said Rudin assignor to Bloom Engineering Company, Inc., Pittsburgh, Pa.; said Shannon assignor to United States Steel Corporation, a corporation of Delaware
Filed Aug. 21, 1968, Ser. No. 754,200
Int. Cl. F27b 3/00
U.S. Cl. 263—40           7 Claims

ABSTRACT OF THE DISCLOSURE

Removal of slag and scale from soaking pit furnaces is accomplished by means of a duct depending from the lowest portion of the soaking pit floor, the passageway of said duct being maintained at a temperature above the melting point of the slag and scale by means of a burner which fires directly into the passageway and causes hot gases to pass throughout the passageway. Additional burners placed at the bottom of the duct provide heated gases at that point to insure the exiting of the slag and scale in the molten state.

---

Our invention relates to apparatus for removal of slag and scale from soaking pits. More particularly, it relates to the use of a duct communicating with a low point in the base of a soaking pit and heating means cooperating with the duct to maintain temperatures within the duct sufficient to insure maintenance of the slag and scale in a molten state so that it will flow from the furnace through the duct into a receptacle positioned at the lower end thereof.

Although there are a number of different types of soaking pits employed in the steel industry today, one problem common to all is the economical removal of the slag and scale which collects on the floor of the soaking pit. This problem has become more severe in recent years because of the constant aim for higher production rates. Increased production rates are frequently accomplished by the use of higher soaking pit temperatures to obtain higher rates of heat transfer to the ingots. However, as the soaking pit temperatures and the rate of heat transfer are increased, the amount of slag resulting from melting a portion of the ingots in the pits also increases. Therefore, associated with higher production rates is the problem of increased slag buildup in the furnace.

In addition, scale forms during the heating of the ingots and during the drawing of an ingot when the pit cover is removed. Much of this scale drops off onto the pit floor. As the productivity of a soaking pit increases, more ingots are processed per unit of time and this results in an overall increase in the amount of scale which is deposited in the furnace and which must be removed. The extent of the problem is indicated by the fact that 1 to 3 percent of the ingot weight processed in a soaking pit is lost as scale alone.

One practice used heretofore to facilitate scale and slag removal has been to install dolomite or coke breeze 12 to 18 inches thick in the bottom of the pit. This material acts as a sponge and serves to keep the ingots above the soupy condition at the extreme bottom of the furnace at least until the buildup reaches the bottom portions of the ingots. When this buildup does occur, a considerable amount of this slag adheres to the ingot bottoms causing yield problems since the bottom of each ingot has to be cut off. It also causes quality problems during subsequent rolling operations.

It is not unusual to see this scale and slag buildup (referred to as bottom buildup) as high as four to five feet above the pit floor.

One solution attempted heretofore is the so-called dry bottom practice. In this practice either none or a very small amount (3 to 4 inches) of a material such as dolomite or magnesite is placed on the pit floor. However, bottom buildup still occurs; and since there is no material (or very little) to act as a sponge on the bottom of the pit, a reaction often takes place on the ingot bottom between the ingot itself and the molten slag. This, of course, accelerates the molten slag buildup in the bottom of the pit.

Since most pits employed today in the steel industry are top fired, this slag buildup causes the ingots to be positioned higher in the pits; and, as a consequence, the ingot tops are often in line with the flame from the burners with the result that the flame impinges directly on the ingots and further increases the amount of slag buildup. This buildup can spill over the bridge wall and start filling up the flues. When this occurs, fuel input decreases because of excessive pit pressure; and, therefore, there is a reduced rate of heating.

The current method of removing this slag and scale utilizes cleanout openings located in the bottom of the pits. These cleanouts, called cinder holes, of which there are usually two per pit, are located in the pit floor and extend through the floor of the pit. These cinder holes are provided with doors or gates of some type at their bottom end and discharge the slag and scale into a container called a cinder bucket located directly under the pit bottom. To manually or mechanically (e.g. overhead cranes) shove the scale and slag buildup through the cleanouts, downtime on the pit is obviously required. Therefore, considerable production time is lost while pit bottoms are being cleaned of the buildup. The labor cost and machinery cost add to the already expensive but necessary processing step.

Our invention eliminates these excessive downtimes for slag and scale removal by providing a means for preventing bottom buildup and for continuously removing slag and scale during the operating cycle. Our invention also improves the efficiency of the heating cycle, as well as the quality of the product, by eliminating the bottom buildup and thus allowing constant and reproducible pit conditions for successive pit charges. Our invention also provides for flushing out excessive scale accumulation from the pit floor which occurs when ingots are being drawn from the pit. The result is a substantial saving in time and money and the minimization of a problem which heretofore has afflicted the industry and remained unsolved for many years.

In accordance with our invention, a duct is provided which communicates with a low point in the pit floor and extends downwardly therefrom. The duct, by means of one or more burners or other heat supplying means, is maintained at a temperature above the melting point of the slag and scale to enable the continuous removal of the slag and scale in the molten condition. Additionally, one or more burners may be provided, if desired, adjacent the outlet of the duct to prevent excessive cooling at the discharge point.

In the accompanying drawings we have shown, for purpose of illustration, a preferred embodiment of our invention. In the drawings:

FIG. 3 is a plan view of a soaking pit showing the slope of the soaking pit floor in relation to the slag removal duct;

FIG. 4 is an elevational view of the slag removal duct and the burner therefor;

FIG. 5 is a section taken along section lines V—V of FIG. 4;

Figure 1:
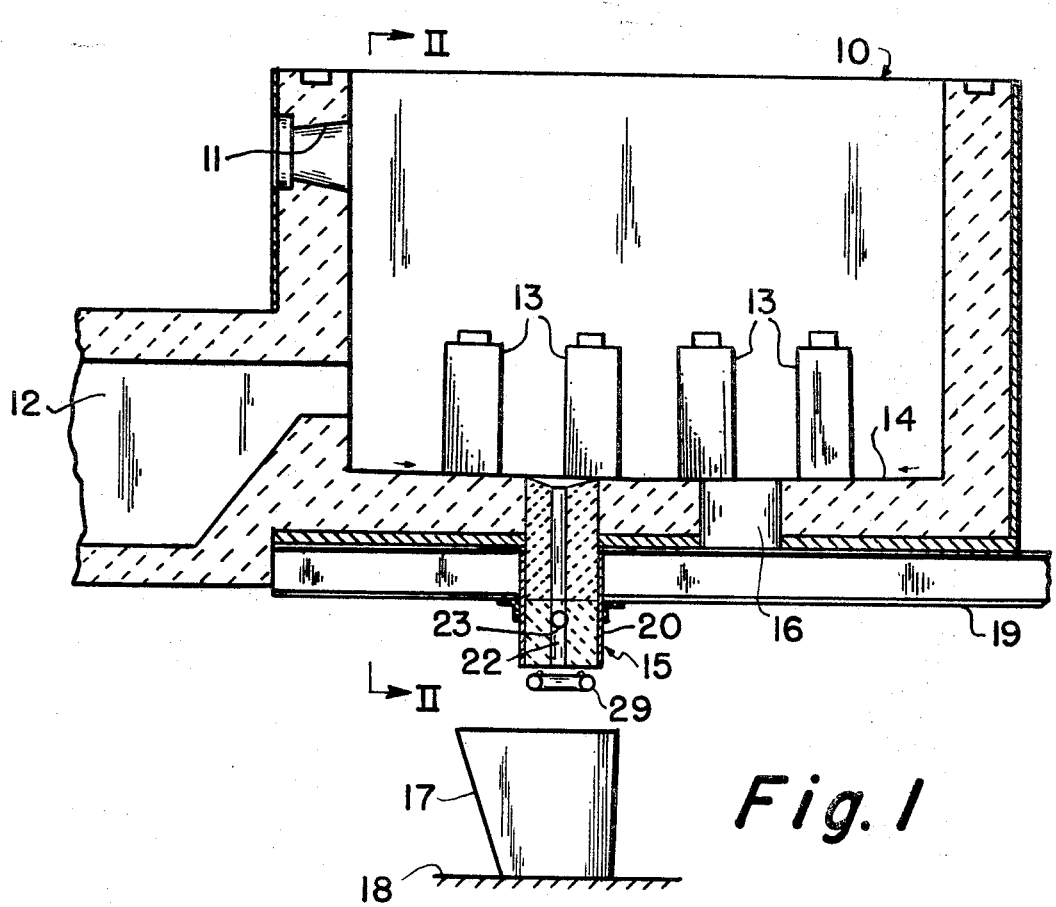
FIG. 1 is a schematic, sectional view showing a single burner top-fired soaking pit.

Our invention is applicable to any of the various types of soaking pits employed in the steel industry today such as single burner top-fired, double burner top-fired or bottom burner soaking pits. For illustrative purposes, we have shown in FIG. 1 a schematic of a typical top-fired soaking pit 10. The source of heat is provided through burner port 11. In the top-fired pit 10, the hot gases are circulated throughout the pit and out the flue 12. The ingots 13, which are placed in the pits by overhead cranes, rest on the pit floor 14. We have shown a completely dry bottom pit; that is, one without dolomite or coke breeze on the pit floor, but pit floor practices other than dry bottom would also be applicable to our invention. The duct 15 for removing slag and scale is positioned so as to communicate with the lowermost portion of the pit floor 14 and extends downwardly through the pit floor and the furnace support members 19. While the duct and its passageway are shown extending vertically, it is readily apparent that either or both could also be constructed at some angle from the vertical. As shown in FIG. 1, a conventional cleanout 16 is also incorporated into the soaking pit as auxiliary equipment should it ever be needed. Normally, as known in the art, two of these cleanouts 16 would be incorporated in a single pit for removal of the slag and scale buildup. The passageway 22 in the duct 15 is positioned over the cinder bucket 17 which rests on the floor 18 beneath the pit. The passageway burner 23 and the bottom ring burner 29 are also shown in FIG. 1 and will be discussed hereinafter.

Figure 2:
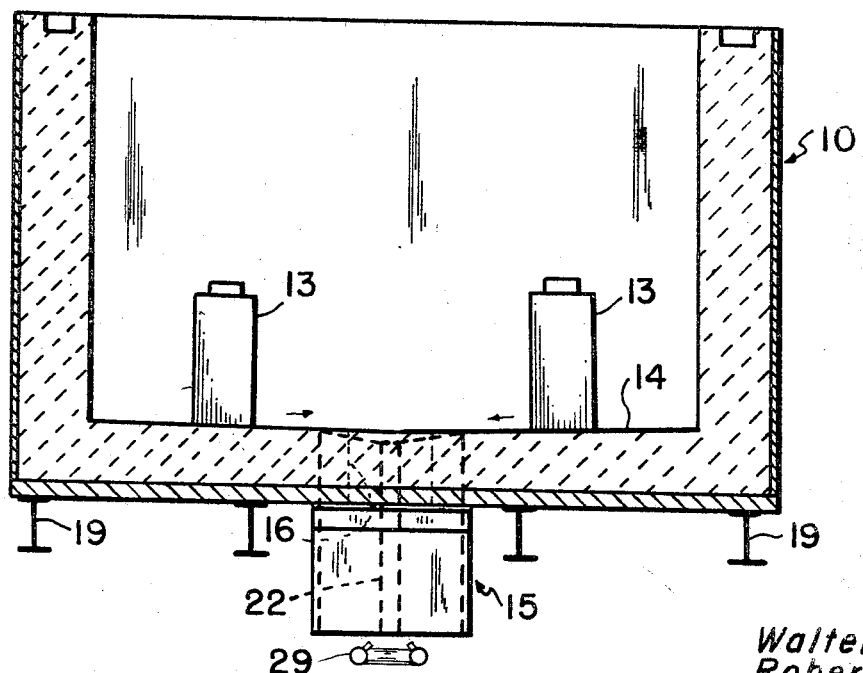
FIG. 2 is a section taken along section lines II—II of FIG. 1.
Figure 6:
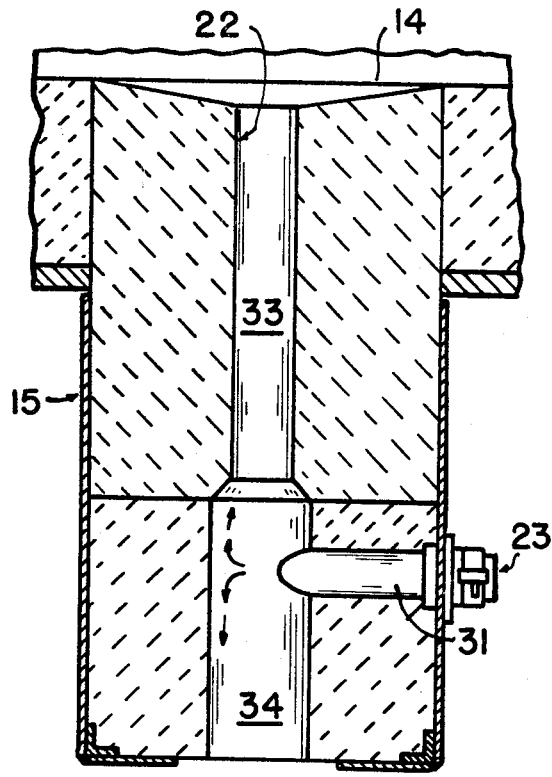
FIG. 6 is an alternative embodiment of the passageway shown in FIG. 5.

The positioning of the ingots and the sloping of the floor in the soaking pit can best be seen by referring to FIGS. 2 and 3. It can be seen in FIG. 2 that the ingots 13 are not positioned immediately over the duct 15 to insure a free and clear passageway 22. The taper of the pit floor 14 toward the slag removal duct 15 can be seen in FIG. 2. While the amount of slope can vary, it has been found that a slope of about one-half inch per foot is quite satisfactory. As shown in FIG. 3, the floor slopes from all directions toward the duct 15.

The exact positioning of the slag removal duct 15 is important. Since the purpose of the slag removal duct in the first instance is to remove the slag and scale in the molten condition, the lowermost point on the pit floor should be positioned in the area of maximum heat. In the case of a single top-fired pit, as shown in FIG. 3, the area of maximum heat is obviously dictated by burner design. In the case of the experimental pit discussed hereinafter, the point of maximum heat was located a third of the way into the pit from the burner itself. By positioning the slag removal duct at this point and by having the floor sloping toward the slag removal duct, you maximize efficiency of removing the slag and scale in the molten condition and prevent the molten slag from eroding the bridge wall which is installed in all pits to keep the slag out of the flues.

Figure 7:
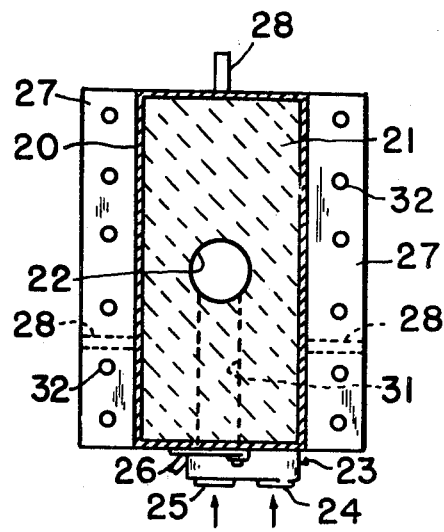
FIG. 7 is a section taken along section lines VII—VII of FIG. 4.

The details of the slag removal duct and the heating means can best be seen in FIGS. 4–8. In FIG. 4, the rectangular steel casing 20 has connecting supports 27 bolted or otherwise suitably fastened to it. As shown in FIG. 7, these connecting brackets or supports 27 have a series of holes 32 through which bolts are placed for attaching to the channel members 19 (FIG. 4) which support the soaking pit itself. For ease in handling the slag duct, we have provided three lifting lugs 28 which are attached to the steel casing 20.

The casing 20 is lined with refractory 21. Since the slag and scale discharge duct is maintained at a temperature above the melting point of the slag or scale, which is in the vicinity of 2600° F., the refractory material should be of such a nature to withstand temperatures of this magnitude. It has been found that a refractory high in alumina and chrome ore has worked quite satisfactorily.

The refractory lining is, of course, shaped to provide the passageway 22 through which the molten slag or scale drains.

To maintain the passageway 22 at a temperature above the melting point of the slag and scale, a burner 23 is provided. The burner 23 can be of a variety of types adaptable to the various fuel sources available. Again, because of the temperature, the fuels must provide a sufficient calorific value to maintain the requisite temperatures. It has been found that the common combustible fuels such as gas, oil, or even coke oven gas can be employed to obtain the necessary temperatures utilizing either air or oxygen or mixtures thereof to support combustion. As can best be seen in FIG. 5, the burner 23 is positioned about two-thirds of the distance down the duct from the floor 14. The burner port 31 extends through the refractory lining 21 into the passageway 22. The burner itself is shown attached to the outer casing 20 of the duct. The burner, as shown, has an air port 24, a gas port 25, and an igniter 26.

As shown in FIG. 5, the burner port 31 enters the passageway 22 perpendicular to it. As shown by the arrows 35 in the passageway 22 in FIG. 5, the heat travels both upwardly and downwardly in the passageway 22. This serves to maintain the entire passageway at the necessary temperature, which is above the melting temperature of the slag and scale. In a typical steel soaking pit where the firing temperature of the pit burner is 2200–2500° F., it has been found that the burner in the slag chute should be maintained at 2600° F. to insure the removal of the slag and scale in the molten state.

The passageway 22, as shown in FIG. 5, need not have a constant diameter. For example, in FIG. 6 the portion of passageway 34 below the burner port 31 is enlarged as compared to the upper portion of the passageway 33. The purpose in doing this is to allow more heat to flow downwardly from burner 23 to help maintain the slag and scale in the molten state.

Because of the movement of air and the products of combustion down and out of the passageway 22, an aspirator effect was found which had a tendency to draw the ambient air from underneath the passageway into immediate contact with the molten particles and solidify them at the bottom of the passageway. To prevent this, a ring type burner 29 is positioned to fire at angles to the bottom of the passageway 22 to provide enough heat to insure the aspirator effect is overcome and that the slag or scale remains molten until it completely leaves the passageway 22. Again, as in the case of the burner 23, the ring type burner can be of a variety of designs which will be dependent upon the type of fuel used.

Figure 8:
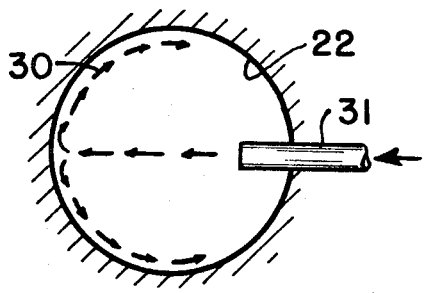
FIG. 8 is a schematic plan view illustrating one way in which the burner for heating the slag removal duct may be positioned.
Figure 9:
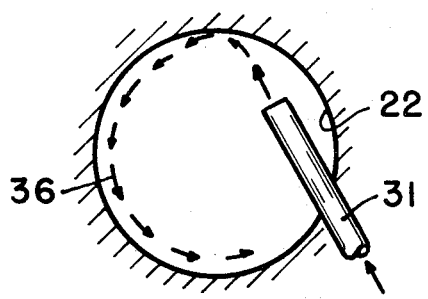
FIG. 9 is a schematic plan view showing the heating burner for the slag removal duct discharging tangentially into the duct.

In FIGS. 8 and 9, two alternate embodiments are shown for effecting the heating of the passageway. In FIG. 8, the burner port 31 is directed along a diameter of the passageway 22 and directly against the wall opposite from the burner. As shown by the arrows 30, the heated air and products of combustion travel in opposite directions when rebounding from the opposite wall. In FIG. 9, the burner port is positioned in the passageway tangentially so that the heated air and products of combustion actually wipe the passageway 22, see arrows 36. While both methods of heat input are satisfactory, it is believed the tangential wiping of the passageway provides the greater efficiency in heating.

The slag removal apparatus of our invention was installed in a 75-ton single top-fired pit in which generally ten 32 by 32 inch ingots were heated. This particular pit had a completely dry bottom. The pit was operated for 28 days without any significant bottom buildup in the pit and no appreciable downtimes for slag or scale removal.

Slag buildup in the pit was kept down by the continual melting of the slag and drainage out through the duct. In addition, the heavy scale which forms and often falls off when the pit cover is taken off was also minimized. This was accomplished by turning the temperature in the soaking pit up from a normal operating temperature of 2450° F. to 2550° F. for a period of one hour after the pit had been emptied of ingots. This melted the scale quite rapidly, and it then drained through the passageway in the molten state. The amount of scale which was removed by this "flushing" step was appreciable, and the time it took was slight in comparison to the hours which are normally spent cleaning pit floors.

It was found that the burner which heated the passageway had no appreciable effect on the heat input into the soaking pit itself. For every 34 million B.t.u.'s provided by the pit burner, one million B.t.u.'s were provided by the slag chute burner. As a practical matter, a passageway about eight inches in diameter would be sufficient to allow proper molten slag and scale drainage. Any material such as fluorspar which lowers the melting point of the slag in the pit itself is beneficial and will help to maintain a slag and scale free soaking pit floor.

While we have shown and described a preferred embodiment of our invention, it will be apparent that departures may be made therefrom within the scope of our invention, as defined in the appended claims.

We claim:

1. Apparatus for removing slag and scale from soaking pit furnaces, comprising:
    (A) A refractory lined duct having a downwardly extending passageway therein communicating at its upper end with the heating chamber of a soaking pit furnace through the floor thereof at a low point in the floor;
    (B) Collecting means adjacent the lower end of said passageway and adapted to receive material discharged from the furnace through said passageway; and
    (C) Heating means positioned intermediate the ends of said duct for supplying heat to said passageway in an amount sufficient to maintain the passageway at a temperature above the melting point of the slag and scale within the furnace;
whereby molten slag and scale are drained continuously from the furnace through said passageway during the operation of the furnace.

2. The apparatus defined in claim 1, wherein the heating means is a fuel burner discharging heated gases into said passageway between the upper and lower ends thereof.

3. The apparatus defined in claim 1, wherein the heating means is a fuel burner positioned to discharge heated gases into the passageway and upwardly through said passageway.

4. The apparatus defined in claim 1, wherein heating means is positioned to discharge heated gases tangentially within the passageway.

5. The apparatus defined in claim 1, wherein the passageway extends substantially vertically.

6. The apparatus defined in claim 1, wherein the passageway has an upper and lower portion, said lower portion being larger in cross-section than said upper portion.

7. The apparatus defined in claim 2, wherein there is also provided a second heating means positioned adjacent the lower end of said passageway to maintain the lowermost portion thereof at temperatures sufficiently high to prevent accumulation of scale and slag at the lower end of said passageway.

References Cited

UNITED STATES PATENTS

| | | | |
|---|---|---|---|
| 2,124,888 | 7/1938 | Morton et al. | 263—52 X |
| 2,297,696 | 10/1942 | Elder et al. | 263—43 |
| 2,859,023 | 11/1958 | Bucci | 263—6 |

JOHN J. CAMBY, Primary Examiner